US012651910B2

(12) United States Patent
Orus et al.

(10) Patent No.: US 12,651,910 B2
(45) Date of Patent: Jun. 9, 2026

(54) OPTIMIZED DELIVERY OF ELECTRICITY OF DOMESTIC RENEWABLE ELECTRICAL ENERGY PRODUCTION DEVICES TO ELECTRIC GRID AND CONSUMPTION OF ELECTRICITY BY HOUSEHOLDS FROM ELECTRIC GRID

(71) Applicant: MULTIVERSE COMPUTING, S.L., Donostia (ES)

(72) Inventors: Roman Orus, Donostia (ES); Gianni Del Bimbo, Donostia (ES)

(73) Assignee: MULTIVERSE COMPUTING, S.L., Donostia (ES)

( * ) Notice: Subject to any disclaimer, the term of this patent is extended or adjusted under 35 U.S.C. 154(b) by 369 days.

(21) Appl. No.: 18/398,871

(22) Filed: Dec. 28, 2023

(65) Prior Publication Data

US 2025/0202240 A1　　Jun. 19, 2025

(30) Foreign Application Priority Data

Dec. 19, 2023　(EP) ..................................... 23383319

(51) Int. Cl.
| | |
|---|---|
| *G06F 17/00* | (2019.01) |
| *H02J 3/00* | (2006.01) |

(Continued)

(52) U.S. Cl.
CPC .............. *H02J 3/381* (2013.01); *H02J 3/003* (2020.01); *H02J 3/004* (2020.01); *H02J 3/466* (2020.01);

(Continued)

(58) Field of Classification Search
CPC .. H02J 3/381; H02J 3/003; H02J 3/004; H02J 3/466; H02J 2101/20; H02J 2103/30;

(Continued)

(56) References Cited

U.S. PATENT DOCUMENTS 8,571,955 B2 * 10/2013 Al Faruque ............ G06Q 40/00
705/412
10,069,454 B2 * 9/2018 Prengler ................ G06Q 50/06
(Continued)

FOREIGN PATENT DOCUMENTS

| CN | 113517709 B | * 7/2022 | ................ H02J 3/32 |
|---|---|---|---|
| CN | 116780627 A | 9/2023 | |

(Continued)

OTHER PUBLICATIONS

Advanced grid planning operations (Year: 2008).*
European Search Report for Application No. 23383319.3, dated May 17, 2024, 10 pages.

*Primary Examiner* — Ronnie M Mancho
(74) *Attorney, Agent, or Firm* — CANTOR COLBURN LLP

(57) ABSTRACT

A method including the following steps: computing availability of at least one renewable electrical energy production device that delivers electricity to at least one household associated therewith to deliver electricity to an electric grid; computing an electricity usage plan for the predetermined period of time; optimizing the electricity usage plan so that: the electricity to be delivered is to be delivered to the electric grid at one or more different time periods at least when an amount of the possible electric power generation corresponding to non-renewable electrical energy generators is greater than at other time periods within the predetermined period of time; and during a predetermined duration after the time period or periods when the electricity is delivered to the electric grid, the electricity delivered by the at least one renewable electrical energy production device for consumption by the respective household is lower than the computed availability during the predetermined duration.

15 Claims, 2 Drawing Sheets

(51) Int. Cl.
　　*H02J 3/38*　　　　　(2006.01)
　　*H02J 3/466*　　　　(2026.01)
　　*H02J 101/20*　　　(2026.01)
　　*H02J 103/30*　　　(2026.01)
　　*H02J 103/35*　　　(2026.01)

(52) U.S. Cl.
　　CPC ....... *H02J 2101/20* (2026.01); *H02J 2103/30*
　　　　(2026.01); *H02J 2103/35* (2026.01)

(58) Field of Classification Search
　　CPC ......... H02J 2103/35; G06Q 10/063116; G06Q
　　　　　　10/06313; G06Q 10/06314; G06Q
　　　　　　10/06315; G06Q 30/0208; G06Q 50/06
　　USPC ......................................................... 700/291
　　See application file for complete search history.

(56)　　　　　References Cited

U.S. PATENT DOCUMENTS

| | | | | |
|---|---|---|---|---|
| 10,079,317 | B2 * | 9/2018 | Gonatas ................ | H10F 77/955 |
| 10,127,568 | B2 * | 11/2018 | Forbes .................. | G06Q 10/04 |
| 11,043,809 | B1 * | 6/2021 | Akyol .................... | G06Q 50/06 |
| 11,656,097 | B2 * | 5/2023 | Vega ........................ | H04Q 9/00 |
| | | | | 340/870.02 |
| 11,868,106 | B2 * | 1/2024 | McNamara .......... | G05B 19/042 |
| 11,916,383 | B2 * | 2/2024 | Buttgenbach .......... | H02J 3/004 |
| 11,989,069 | B2 * | 5/2024 | King ........................ | G06F 1/28 |
| 12,294,217 | B2 * | 5/2025 | McNamara ............ | H02J 3/008 |
| 12,380,497 | B2 * | 8/2025 | Berbach ................ | G06Q 40/12 |
| 12,434,586 | B2 * | 10/2025 | McNamara ............ | B60L 53/68 |

| | | | | |
|---|---|---|---|---|
| 2005/0127680 | A1 * | 6/2005 | Lof ....................... | F03D 7/0284 |
| | | | | 290/44 |
| 2008/0150286 | A1 * | 6/2008 | Fein ........................ | F03D 9/255 |
| | | | | 290/55 |
| 2013/0103557 | A1 * | 4/2013 | Larocque .............. | G06Q 30/04 |
| | | | | 705/34 |
| 2019/0041886 | A1 * | 2/2019 | Hakim ..................... | G05F 1/66 |
| 2021/0003974 | A1 * | 1/2021 | Yang .................... | G05B 13/027 |
| 2021/0123771 | A1 * | 4/2021 | Vega ........................ | H04Q 9/00 |
| 2021/0273483 | A1 * | 9/2021 | Ding ....................... | H02J 3/381 |
| 2022/0052524 | A1 * | 2/2022 | Akyol .................... | G06Q 50/06 |
| 2022/0052525 | A1 * | 2/2022 | Buttgenbach .......... | G06Q 50/06 |
| 2022/0121260 | A1 * | 4/2022 | King ........................ | G06F 1/28 |
| 2022/0222548 | A1 * | 7/2022 | Orus ..................... | G06N 10/00 |
| 2023/0196154 | A1 * | 6/2023 | Del Bimbo ........... | G06N 20/20 |
| | | | | 706/62 |
| 2023/0299586 | A1 * | 9/2023 | Cudak .................... | H02J 3/003 |
| | | | | 700/295 |
| 2024/0047968 | A1 * | 2/2024 | Agostini ................. | H02J 3/003 |
| 2024/0405550 | A1 * | 12/2024 | Rolnik ................... | H02J 3/003 |
| 2025/0202239 | A1 * | 6/2025 | Orus ..................... | H02J 3/003 |
| 2025/0202240 | A1 * | 6/2025 | Orus ..................... | G06Q 50/06 |
| 2025/0216919 | A1 * | 7/2025 | King ........................ | G06F 1/28 |
| 2025/0232389 | A1 * | 7/2025 | Dunbar ............. | G06Q 30/0207 |

FOREIGN PATENT DOCUMENTS

| | | | | | |
|---|---|---|---|---|---|
| KR | 20100062054 | A | * | 6/2010 | ............ G06Q 10/04 |
| RU | 2014105856 | A | * | 8/2015 | ............... H02J 3/00 |
| WO | WO-2011027339 | A1 | * | 3/2011 | ............ G06Q 30/04 |
| WO | 2015048737 | A1 | | 4/2015 | |

* cited by examiner

OPTIMIZED DELIVERY OF ELECTRICITY OF DOMESTIC RENEWABLE ELECTRICAL ENERGY PRODUCTION DEVICES TO ELECTRIC GRID AND CONSUMPTION OF ELECTRICITY BY HOUSEHOLDS FROM ELECTRIC GRID

CROSS-REFERENCE TO RELATED APPLICATIONS

This application claims the benefit of European patent application 23383319.3, filed on 19 Dec. 2023, the disclosure of which is incorporated herein by reference in its entirety.

TECHNICAL FIELD

The present disclosure relates to the field of electricity. More specifically, it relates to the management of electricity generated by renewable electrical energy production devices of households for possible delivery to an electric grid at predetermined moments to reduce the amount of electricity in the electric grid that is to be provided by non-renewable electrical energy production devices, and possible consumption of electricity of the electric grid to reduce excess available electricity.

BACKGROUND

The advances in electricity production and electricity storage have caused a cost reduction of renewable electrical energy production devices and batteries, thereby making them more affordable to end consumers in their households. Along with this situation, some countries have obliged the installation of such devices in new households and buildings whenever they are built, hence there has been a growth in the ubiquity of the devices. Further, the progressive adoption of electrical vehicles such as cars and motorbikes has, on the one hand, increased the electricity demand of consumers and, on the other hand, has made available to the consumers storage (or additional storage) of electricity.

All this has modified the way in which electricity must be produced and stored by the electric grid to serve all the end consumers in an efficient manner. The electric grid provides electricity to the different households whenever they demand electricity and the renewable electrical energy they produce is insufficient or is not used and kept stored. The renewable electrical energy produced at the households may likewise be provided to the electric grid so that other end consumers can use it if necessary.

The global trend is to reduce the number of non-renewable electrical energy sources, such as fossil fuels, that are needed for electrically powering all households, buildings, factories, and means of transportation. A small contribution towards this goal is, for example, to use appliances whenever there are no significant electricity demands in the grid so that most, if not all, electricity delivered to the household for powering of the appliances comes from a renewable electrical energy source.

There are further ways of contributing towards that goal, like managing the electricity produced in the households for delivering it to the electric grid when that can result in the reduction in dependence on non-renewable electrical energy sources. Proper management of such electricity based on the status of the electric grid and the existing electricity demands may enhance said reduction.

It is considered that it would be convenient to have techniques, apparatuses and systems for managing the electricity produced by renewable electrical energy production devices of a plurality of households with regards delivery to the electric grid at particular time periods and, optionally, for managing the consumption of electricity available at the electric grid by the plurality of households.

SUMMARY

A first aspect of the disclosure relates to a method that comprises:

computing availability of at least one renewable electrical energy production device that delivers electricity to at least one household associated therewith to deliver electricity to an electric grid, where:

the availability is computed for a predetermined period of time and is at least based on a predetermined electricity consumption plan for the predetermined period of time, the availability representing how much electricity the at least one renewable electrical energy production device may deliver to the electric grid at different time periods within the predetermined period of time; and the predetermined electricity consumption plan is associated with the at least one household and comprises electricity to be consumed by the at least one household at the different time periods within the predetermined period of time; computing an electricity usage plan for the predetermined period of time, wherein:

the electricity usage plan is associated with the at least one household and represents both: the electricity to be delivered by the at least one renewable electrical energy production device associated with each household of the at least one household to the electric grid at the different time periods within the predetermined period of time, and the electricity to be consumed by each household of the at least one household at the different time periods within the predetermined period of time; and the electricity usage plan is computed based, at least in part, on:

a set of values that is indicative of possible electric power generation that the electric grid has access to at different time periods within the predetermined period of time, wherein one or more electrical energy generators associated with the possible electric power generation are capable of starting electric power generation with a predetermined time delay and are capable of maintaining the electric power production for at least a predetermined time duration; and the computed availability of the at least one renewable electrical energy production device;

optimizing the electricity usage plan so that:

the electricity to be delivered by the at least one renewable electrical energy production device associated with the respective household is to be delivered to the electric grid at one or more different time periods at least when an amount of the possible electric power generation corresponding to non-renewable electrical energy generators is greater than at other time periods within the predetermined period of time; and during a predetermined duration after the time period or periods when the electricity is delivered to the electric grid, the electricity delivered by said at least one renewable electrical energy production device for consumption by the respective household of the at least one household is lower than the computed availability during said predetermined duration.

An apparatus or system conducts the aforesaid computations and optimization. The apparatus or system includes one of: a computing apparatus, a computing system, a quantum apparatus, a quantum system, or a combination thereof.

The apparatus or system, which may be a virtual power plant (VPP), computes when one or more renewable electrical energy production devices are capable of providing electricity to the electric grid and to what degree (e.g. for how long and/or how much electricity) depending on the expected consumption of the household that the one or more devices are associated with. In this sense, the apparatus or system has the predetermined electricity consumption plan that is an estimation of the electricity consumption by the household.

Accordingly, the apparatus or system has data with which it can determine when electricity might be requested by devices, appliances, means of transportation, etc. within the household during the predetermined period of time (e.g. one day, half a day, 8 hours, etc.), and when electricity could be provided to the electric grid based on the production capabilities of the production devices and the storage capabilities of storing devices associated with the production devices.

The electricity usage plan is at least indicative of how the produced renewable electricity shall be provided to the electric grid, if any at all, since it may occur that the apparatus or system determines that no electricity shall be provided as it may be more advantageous that the household uses its own produced renewable electricity rather than having to demand electricity (or having to demand much more electricity whenever the produced electricity is not enough) from the electric grid. For that, the apparatus or system takes into account the set of values indicative of possible electric power generation that the electric grid has access to, and the computed availability of the at least one renewable electrical energy production device. The possible electric power generation is data available to and from the electric grid following agreed availability of the one or more electrical energy generators intended to cope with peaks of electricity demand (and, also, one or more electrical energy consumers intended to cope with peaks of excess electricity) throughout the predetermined period of time; that is to say, as part of the electric grid available electricity, there are available electrical energy generators associated with the electric grid that can start energy production (or consumption in the case of electrical energy consumers) with the predetermined time delay (e.g. 15 minutes, 30 minutes, etc.) and continue producing electricity afterwards for at least the predetermined time duration (e.g. 1 hour, 2 hours, etc.). When there is a surge in electricity demand, some or all electrical energy generators are commanded, by controllers of the electric grid, to start electricity production and delivery to the electric grid. These electrical energy generators can be of non-renewable electrical energy sources, and/or of renewable electrical energy sources, the use of the first generators being the ones that the present methods intends to reduce.

Then, the apparatus or system, conducts an optimization process whereby the electricity usage plan is modified. The optimization is such that it tends to reduce the number of non-renewable electrical energy generators at those times when the number is the greatest or is greater than at some other times within the predetermined period of time. This means that the optimization does not aim at simply reducing the number of such generators, but reducing it particular moments within the predetermined period of time, thereby attempting to even out the number of such generators during the predetermined period of time by reducing the peak values.

Further, the optimization takes into account the electricity that is to be consumed by the at least one household at a period of time posterior to when the produced electricity is to be delivered to the electric grid. This is so because the at least one renewable electrical energy production device shall be capable of producing sufficient (or at least some amount of) electricity for being available for the household when energy might be needed. Namely, the produced electricity might be provided to the electric grid when, afterwards, further produced electricity will not have to be immediately provided to the household for powering apparatuses therein.

The predetermined electricity consumption plan can be established by way of e.g. historical data, probability distributions, consumer profiling, etc.; there are a number of calculation techniques for providing an electricity consumption plan, which are not described in the present disclosure in order not to obscure the present teachings, but all said calculation techniques are possible within the scope of the present disclosure. Likewise, the availability might be established by way of e.g. historical data, probability distribution, mathematical models and artificial intelligence algorithms that combine any of these data with e.g. weather data, etc.; there are a number of calculation techniques for providing the availability, which are not described in the present disclosure in order not to obscure the present teachings, but all said calculation techniques are possible within the scope of the present disclosure.

In some embodiments, the method further comprises: commanding, by the apparatus or system, to deliver electricity from the at least one renewable electrical energy production device to the electric grid based on the optimized electricity usage plan.

Once the electricity usage plan is calculated and optimized, the apparatus or system manages the delivery of electrical energy to the electric grid according to the established plan. Hence, the electricity is provided to the electric grid at the time periods that the apparatus or system has determined to be the most convenient ones for reducing the number of non-renewable electricity generators.

Depending on how the apparatus or system is configured, the electricity to be delivered might be, in some embodiments, the part of the optimized electricity usage plan that represents the electricity to be delivered by the at least one renewable electrical energy production; whereas, in some other embodiments, it is the difference between said part of the optimized electricity usage plan and the computed availability of the at least one renewable electrical energy production device.

In some embodiments, the electricity usage plan is optimized so that the amount of electricity to be delivered to the electric grid by each household of the at least one household is also lower than the electricity by said at least one renewable electrical energy production device and that is consumed by the respective household of the at least one household during the predetermined duration.

The provision of electricity to the electric grid is restricted to an amount that does not keep the at least one household without produced electric grid for the predetermined duration. During the predetermined duration, the renewable electrical energy production device(s) are expected to produce further electricity that the household will be capable of using, but having no available produced electricity during these times might cause that the at least one household demands an amount of electricity from the electric grid that requires the production of electricity from non-renewable sources. In order to reduce the likelihood of having to require electricity from non-renewable sources and, thus, making possible restitution of the electricity production by the device(s) of the household(s), the amount delivered to the electric grid is less than the expected consumption by the household(s) during the predetermined duration.

In some embodiments, the computed availability of the at least one renewable electrical energy production device further represents, by way of a parameter or set of parameters, a minimum amount of possible electric power generation that must be provided by non-renewable electrical energy generators to the electrical grid at the different time periods for the at least one renewable electrical energy production device associated with the respective household to deliver electricity to the electrical grid rather than to be consumed by the respective household of the at least one household.

A restriction may be established whereby no electricity is provided to the electric grid when the amount of possible electric power generation does not include sufficient amount, according to a predetermined amount threshold, of non-renewable electric power generation.

In these cases, inaccuracies in the predicted electricity consumption by the at least one household are to be compensated by keeping, the at least one household, the electricity it has produced via its renewable electricity production devices so that the household(s) consumes its own produced electricity whenever apparatuses, appliances and/or transportation means are to be electrically powered. In this sense, the risk of increasing the total number of non-renewable electric power generation by having to request electricity from the electric grid due to unavailability of renewable electricity produced in the household(s) is lower. It could also occur that, due to the electric power consumed by the at least one household and the electricity present or available for generation at the electric grid, the delivery of produced electricity in the household(s) to the electric grid would have achieved a lower amount of non-renewable electricity, however there is uncertainty in estimations and predictions made, and transportation of produced electricity to the electric grid, and then to the end consumer causes losses that are lower if the electrical energy is left for consumption in the respective household(s).

In some embodiments, the electricity usage plan is optimized such that households of the at least one household whose at least one renewable electrical energy production device is to deliver electricity to the electric grid each at least fulfills the following:

$$\left(E_{i,\tau}^{*,+} - E_{i,\tau}^{+}\right)\lambda_{i,\tau}^{+} \geq \sum_{t=\tau+m}^{D} \left(E_{i,t}^{+}P_{i,t}^{res,+} - E_{i,t}^{*,+}P_{i,t}^{*,+}\right)$$

where: D is the predetermined period of time; z is a time period within D; m is a predetermined time after the end of time period z that starts a restitution period;

$$E_{i,\tau}^{*,+} \text{ and } E_{i,t}^{*,+}$$

are electrical energy consumption of the i-th household of the at least one household at time periods τ and t in the electricity usage plan;

$$E_{i,\tau}^{+} \text{ and } E_{i,t}^{+}$$

are optimizable electrical energy available at time periods τ and t for delivery by the i-th household of the at least one household in the electricity usage plan;

$$\lambda_{i,\tau}^{+}$$

is the optimizable parameter or set of parameters defining, for time period τ, an objective to be met for electricity to be delivered to the electric grid by the different devices of the at least one renewable electrical energy production device of the i-th household of the at least one household;

$$P_{t}^{*,+}$$

is a parameter associated with the electrical energy consumption at time period t that is representative, at least in part, of an amount of the electrical energy being from non-renewable electrical energy sources; and $$P_{t}^{res,+}$$

is a parameter associated with the electrical energy consumption during restitution (i.e. the predetermined duration after time period t) that is representative, at least in part, of an amount of the electrical energy being from non-renewable electrical energy sources.

In this equation and in other equations below, superscript + denotes a situation of the electric grid in which the demand for electricity is greater than the available electricity; the situation the electric grid is in is usually represented in literature with Greek letter sigma σ, with sigma being positive when the available electricity is less than the demanded electricity, and sigma being negative when the available electricity is greater than the demanded electricity.

The term at the left-hand side of the inequality corresponds to the energy consumption at time period τ of the electricity usage plan to be optimized via $$\lambda_{i,\tau}^{+},$$

and the term at the right-hand side of the inequality corresponds to the difference between the electricity consumption of the predetermined electricity consumption plan $$\left(\text{i.e. } E_{i,t}^{*,+}P_{i,t}^{*,+}\right),$$

which is also present in the electricity usage plan, and the electricity consumption during restitution $$\left(E_{i,t}^+ P_{i,t}^{res,+}\right) \quad 5$$

of the i-th household as defined in the electricity usage plan. Delay m sets the start of the restitution period, i.e. the predetermined duration.

The optimization of parameter or set of parameters $$\lambda_{i,\tau}^+ \quad 15$$

is such that it ensures that restitution of the electricity delivery by the renewable electrical energy production devices of the i-th household is possible according to the expected electricity consumption of the household and a previous (at time period z) increased electricity delivery. The apparatus or system thus sets the value(s) of $$\lambda_{i,\tau}^+ \quad 25$$

to establish how the households are to deliver electricity to cooperate with the electric grid to increase electrical energy available therein.

In some embodiments, the electricity usage plan is optimized such that households of the at least one household whose at least one renewable electrical energy production device is to deliver electricity to the electric grid each further at least fulfills the following:

$$E_{i,\tau}^+ \geq E_{i,\tau}^{min,+} \quad 40$$

where:

$$E_{i,\tau}^+ \quad 45$$

is electrical energy available at time period $\tau$ for delivery by the i-th household of the at least one household in the electricity usage plan; and $$E_{i,\tau}^{min,+} \quad 55$$

is a predetermined minimum deliverable electrical energy by the i-th household of the at least one household at time period $\tau$.

The electricity that is to be delivered to the electric grid may have a predetermined minimum (or maximum) in terms of electrical energy or electric power to be provided to the electric grid to avoid possible malfunctions in the electrical system of the at least one household. The minimum is determined by the particular characteristics of the electrical system of the respective household.

In some embodiments, the electricity usage plan is optimized by minimizing the following function for each household of the at least one household:

$$C_0 = \sum_{\sigma=\pm} \sum_{\tau=0}^{D} \sigma \left[ \sum_i \left(E_{i,\tau}^\sigma - E_{i,\tau}^{*,\sigma}\right) \lambda_{i,\tau}^\sigma - \left(\Gamma_\tau^\sigma - \hat{\lambda}_\tau^\sigma\right) \hat{E}_{i,\tau}^\sigma \eta_\tau^\sigma \right]$$

where: D is the predetermined period of time; $\tau$ is a time period within D; m is a predetermined time after the end of time period z that starts a restitution period;

$$E_{i,\tau}^{*,+}$$

is electrical energy consumption of the i-th household of the at least one household at time period $\tau$ in the electricity usage plan;

$$E_{i,\tau}^\sigma$$

is optimizable electrical energy available at time period $\tau$ for delivery by the i-th household of the at least one household in the electricity usage plan;

$$\lambda_{i,\sigma}^\sigma$$

is the optimizable parameter or set of parameters defining, for time period $\tau$, an objective to be met for electricity to be delivered to the electric grid by the different devices of the at least one renewable electrical energy production device of the i-th household of the at least one household;

$$\hat{E}_\tau^\sigma$$

is an optimizable term defining which renewable electrical energy production devices or which part of the electricity to be delivered to the electric grid will do so participating as starting participant at time period $\tau$, and which other devices or other part will do so participating as backup participant at time period $$\tau; \hat{\lambda}_\tau^\sigma$$

is an optimizable parameter or set of parameters defining, for time period $\tau$, an objective to be met for electricity to be delivered to the electric grid by the at least one household either as starting participants or as backup participants;

$$\Gamma_\tau^\sigma$$

9 is the set of values that is indicative of possible electric power generation that the electric grid has access to at different time periods;

$$\eta_\tau^\sigma$$

is a parameter defining a level of stochasticity of or level of confidence in carrying out the delivery of electricity to the electric grid.

The above equation is an objective function or part of an objective function (i.e. it is a term that is present in an objective function) that is optimized by the apparatus or system by way of minimization.

Electric grids are generally configured such that possible electric power generation requires starting and backup participants; the same also occurs with regards possible electric power consumption when there is excess electricity available in the electric grid for consumption, electricity consumers as starting and backup participants are provided.

Starting participants are the generators (or consumers when possible electric power consumption has to be used) that will initially attempt to provide the necessary electricity to the electric grid. Backup participants are the generators (or consumers when possible electric power consumption has to be used) that take the place of starting participants that are not capable of providing the necessary electricity for whatever reason (e.g. generator malfunction, problem in the transport network, etc.). There has to be a pool of starting participants and a pool of backup participants that the electric grid may choose from. The optimization conducted by the apparatus or system likewise determines whether renewable electrical energy production devices are to deliver electricity to the electric grid, and whether it has to do so as starting participant or backup participant. Further, the same or more electricity must be available for delivery to the electric grid by the backup participants than by the starting participants so as to be able to cope with problems that may arise in the electricity production of the starting participants.

The terms $$\hat{E}_\tau^\sigma \text{ and } \hat{\lambda}_\tau^\sigma$$

may take different forms, an exemplary one being as follows:

$$\hat{E}_\tau^\sigma = \sum_i \left( x_{i,\tau,SP}^\sigma E_{i,\tau,SP}^\sigma + x_{i,\tau,BP}^\sigma E_{i,\tau,BP}^\sigma \right)$$

$$\hat{\lambda}_\tau^\sigma = \frac{\sum_i \left( x_{i,\tau,SP}^\sigma E_{i,\tau,SP}^\sigma \lambda_{i,\tau,SP}^\sigma + x_{i,\tau,BP}^\sigma E_{i,\tau,BP}^\sigma \lambda_{i,\tau,BP}^\sigma \right)}{\sum_i \left( x_{i,\tau,SP}^\sigma E_{i,\tau,SP}^\sigma + x_{i,\tau,BP}^\sigma E_{i,\tau,BP}^\sigma \right)}$$

where: subscript SP denotes starting participant, and subscript BP denotes backup participants;

$$x_{i,\tau}^\sigma$$

10 being a binary variable defining whether i-th renewable electrical energy production devices will deliver electricity to the electric grid or not. To this end, $$E_{i,\tau}^\sigma$$

is:

$$E_{i,\tau}^\sigma = \sum_{k=0}^{N_k-1} \mathcal{U}_{k,\tau}^\sigma E_{k,\tau}^{max,\sigma}$$

where:

$$\mathcal{U}_{k,\tau}^\sigma$$

is an optimizable binary variable defining whether the k-th renewable electrical energy production device of the respective household is to deliver electricity to the electric grid at time period $$\tau; E_{k,\tau}^{max,\sigma}$$

is a predetermined maximum deliverable electricity by the k-th renewable electrical energy production device at time period $\tau$.

It can occur that not all the renewable electrical energy production devices are to deliver electricity to the electric grid, or not at the same time, if reduction in the amount of electricity from non-renewable sources within the predetermined period of time can be improved by not delivering the electricity of all the devices (or at once).

In some embodiments, optimizing the electricity usage plan comprises: constructing, for each household of the at least one household, a respective availability vector corresponding to all renewable electrical energy production devices associated with the respective household; wherein the electricity usage plan is optimized based on the constructed availability vectors.

The availability vectors may have two distinct variables defining the flexibility of the household to participate in the provision of electricity to or consumption of electricity from the electric grid. Particularly, the availability vector can be:

$$F^\sigma(\tau) = (E_\tau^\sigma, \lambda_\tau^\sigma)$$

where $\tau$ is the particular time period, $$E_\tau^\sigma$$

is the electrical energy to be provided to or consumed from the electric grid at time period $$\tau, \text{ and } \lambda_\tau^\sigma$$

is the parameter or set of parameters defining, for time period $\tau$, an objective to be met for electricity to be delivered to the electric grid by the different devices of the at least one renewable electrical energy production device of the i-th household or consumed from the electric grid by the i-th household; delivery being considered for $\sigma=+$ and consumption being considered for $\sigma=-$. The availability vectors thus end up being:

$$F^{i,\sigma}(\tau) = \left[ \left( E_{i,0}^{\sigma}, \lambda_{i,0}^{\sigma} \right), \dots, \left( E_{i,D-1}^{\sigma}, \lambda_{i,D-1}^{\sigma} \right) \right]$$

where i is the i-th household, and $\tau$ ranges from the start to the end of the predetermined period of time D.

The provision of the availability vectors simplifies the eventual objective function to be optimized by the apparatus or system since each availability vector relates to one household, and the objective function relates to all households in the at least one household, thereby making possible to run the optimization over all households for a global solution.

In some embodiments, the electricity usage plan is optimized such that it additionally or alternatively fulfills the following:

electricity is to be consumed, by one or more households of the at least one household, from the electric grid at one or more different time periods within the predetermined period of time at least when excess electricity is available in the electric grid (i.e. the demand is lower than the available electricity); and during a predetermined duration after the time period or periods when the excess electricity is to be consumed, the electricity consumed by said one or more households is lower than that in the predetermined electricity consumption plan during said predetermined duration.

One or more households might cooperate with the electric grid for reduction of excess electricity that, for example, cannot be stored by the electric grid. The consumption of electricity at these times is convenient for powering e.g. appliances that will not have to powered later on. Hence, at a posterior time, renewable electrical energy produced by the respective household or households may be sufficient for remaining electricity needs of the household, or for delivery to the electric grid when the demand for electricity is greater than the available electricity.

By changing when the electricity from the electric grid is consumed, fewer non-renewable electrical energy sources may be necessary throughout the predetermined period of time. In this sense, the optimization is preferably carried out such that:

the excess electricity to be consumed is at time periods when the amount of excess electricity is the greatest, thereby evening out the excess electricity within the predetermined period of time; and/or the computed availability indicates that electricity is going to be produced by at least one renewable electrical energy production device of the one or more households after the time period (or periods) when the excess electricity is to be consumed.

In some embodiments, the electricity usage plan is optimized such that households of the at least one household consume the excess electricity from the electric grid such that each at least fulfills the following:

$$\left( E_{i,\tau}^{-} - E_{i,\tau}^{*,-} \right) \lambda_{i,\tau}^{-} \leq \sum_{t=\tau+m}^{D} \left( E_{i,t}^{*,-} P_{i,t}^{*,-} - E_{i,t}^{-} P_{i,t}^{res,-} \right)$$

where: D is the predetermined period of time; $\tau$ is a time period within D; m is a predetermined time after the end of time period z that starts a restitution period;

$$E_{i,\tau}^{*,-} \text{ and } E_{i,t}^{*,-}$$

are electrical energy consumption of the i-th household of the at least one household at time periods $\tau$ and t in the electricity usage plan;

$$E_{i,\tau}^{-} \text{ and } E_{i,t}^{-}$$

are optimizable electrical energy consumptions at time periods $\tau$ and t by the i-th household of the at least one household in the electricity usage plan;

$$\lambda_{i,\tau}^{-}$$

is the optimizable parameter or set of parameters defining, for time period $\tau$, an objective to be met for the excess electricity to be consumed by the i-th household of the at least one household;

$$P_{t}^{*,-}$$

is a parameter associated with the electrical energy consumption at time period t that is representative, at least in part, of how much excess electricity is available; and $$P_{t}^{res,-}$$

is a parameter associated with the electrical energy consumption during restitution (i.e. the predetermined duration after time period t) that is representative, at least in part, of how much excess electricity is available.

The optimization of parameter or set of parameters $$\lambda_{i,\tau}^{-}$$

is such that it ensures that restitution of the electric consumption by the i-th household is possible according to the expected electricity consumption of the household and a previous (at time period τ) increased or decreased electricity consumption. The apparatus or system thus sets the value(s) of $$\lambda_{i,\tau}^{-}$$

to establish how the households are to consume electricity to cooperate with the electric grid to reduce the excess electricity available therein.

Also, in some embodiments, the optimization of the electricity usage plan can be carried out by minimizing (or further minimizing) of the aforementioned function $C_0$ for each household of the at least one household for consumption of the excess electricity (i.e. σ=−).

In some embodiments, the electricity usage plan is optimized such that households of the at least one household consume the excess electricity such that each further at least fulfills the following:

$$E_{i,\tau}^{-} \leq E_{i,\tau}^{max,-}$$

where:

$$E_{i,\tau}^{-}$$

is electrical energy at time period z to be consumed by the i-th household of the at least one household in the electricity usage plan; and $$E_{i,\tau}^{max,-}$$

is a predetermined maximum consumable electrical energy by the i-th household of the at least one household at time period τ.

The electricity that is to be consumed from the electric grid may have a predetermined maximum (or minimum) in terms of electrical energy or electric power to be provided from the electric grid to the household to avoid possible malfunctions in the electrical system of the at least one household. The maximum is determined by the particular characteristics of the electrical system of the respective household.

In some embodiments, the parameter or set of parameters $$\lambda_{\tau}^{\sigma}$$

is or includes a break-even price for the households of the at least one household to provide electricity to the electric grid, and/or to consume electricity from the electric grid.

It can occur that the only way for the apparatus or system to establish how much of the possible electric power generation is from non-renewable sources is by means of the price that the electricity is sold to consumers and/or bought from consumers. The price and the amount of electricity from non-renewable sources are related: greater pricing is associated with a larger amount of non-renewable electricity because electricity production is less cost-effective when it must be produced with non-renewable sources.

With optimized or optimizable $$\lambda_{\tau}^{\sigma}$$

in terms of pricing, the determination of the objective to be met electricity being provided to the electric grid and/or consumed from the electric grid (due to excess electricity available) may be made dependent upon the price offered by the electric grid. When the offered price exceeds the break-even price, the respective household is to participate in the provision and/or consumption of electricity to/from the electric grid for reducing the amount of electricity from non-renewable sources present in the electric grid. When the offered price does not exceed the break-even price, it is considered that the respective household would not contribute to reduce the amount of electricity from non-renewable sources present in the electric grid by participating in the provision and/or consumption of electricity to/from the electric grid.

In some embodiments, optimizing the electricity usage plan is carried out by:

providing, for each household of the at least one household, a respective matrix product state with a plurality of tensors, each tensor corresponding to a time subinterval of the predetermined period of time, and each tensor connected to both the tensor of the preceding time subinterval and the tensor of the posterior time subinterval with the proviso of first and last tensors of the matrix product state that are connected to one of the tensors; and optimizing each provided matrix product state.

The objective function to be optimized can be provided in the form of a tensor network whereby tensors of time subintervals are connected, in the virtual dimension, to tensors of consecutive time subintervals such that there is correlation between the tensors with respect to time.

The provision of such tensor network eases the optimization problem owing to tensor network solving techniques. In this sense, each household of the at least one household can have its electricity usage optimized individually, for example by optimizing Hamiltonian functions.

In some embodiments, prior to the optimization of each provided matrix product state, each provided matrix product state is decomposed into:

a first tensor codifying an electricity available for delivery by the respective renewable electrical energy production device or devices at the different time periods in the electricity usage plan together with a binary variable defining whether the respective renewable electrical energy production device or devices are to deliver the electricity to the electric grid;

a second tensor codifying a minimum amount of possible electric power generation that must be provided by non-renewable electrical energy generators to the electrical grid at the different time periods for the respective renewable electrical energy production device or devices to deliver electricity to the electrical grid rather than to be consumed by the at least one household associated therewith; and a third tensor codifying binary variables defining whether the respective renewable electrical energy production device or devices participate as starting participants or backup participants in the delivery of electricity to the electric grid at the different time periods.

In some embodiments, the optimization of each provided matrix product state is carried out by way of density matrix renormalization group or time-evolution block-decimation.

In some embodiments, the method further comprises: estimating, by the apparatus or system, the electricity in the predetermined electricity consumption plan to be consumed by each household of the at least one household at different time periods within the predetermined period of time based on one or more sets of values with historical electricity consumption of the respective household. In some of these and in some other embodiments, the estimation is based on, or further based on, probability distributions defining electricity consumption of the respective household.

In some embodiments, the step of computing the availability further comprises estimating, by the apparatus or system, the electricity that can be produced at different time periods within the predetermined period of time based on one or more sets of values with historical electricity production of the at least one household and/or weather data.

A second aspect of the disclosure relates to a data processing device or system including means for carrying out the steps of a method according to the first aspect.

A third aspect of the disclosure relates to a device or system including: at least one processor, and at least one memory including computer program code for one or more programs; the at least one processor, the at least one memory, and the computer program code configured to cause the device or system to at least carry out the steps of a method according to the first aspect.

A fourth aspect of the disclosure relates to a computer program product including instructions which, when the program is executed by a computer, cause the computer to carry out the steps of a method according to the first aspect.

A fifth aspect of the disclosure relates to a non-transitory computer-readable medium encoded with instructions that, when executed by at least one processor or hardware, perform or make a device to perform the steps of a method according to the first aspect.

A sixth aspect of the disclosure relates to a computer-readable data carrier having stored thereon a computer program product according to the fourth aspect.

BRIEF DESCRIPTION OF THE DRAWINGS

To complete the description and in order to provide for a better understanding of the disclosure, a set of drawings is provided. Said drawings form an integral part of the description and illustrate embodiments, which should not be interpreted as restricting the scope of the disclosure, but just as examples of how the disclosed methods or entities can be carried out. The drawings comprise the following figures.

DETAILED DESCRIPTION OF THE DRAWINGS

Figure 1:
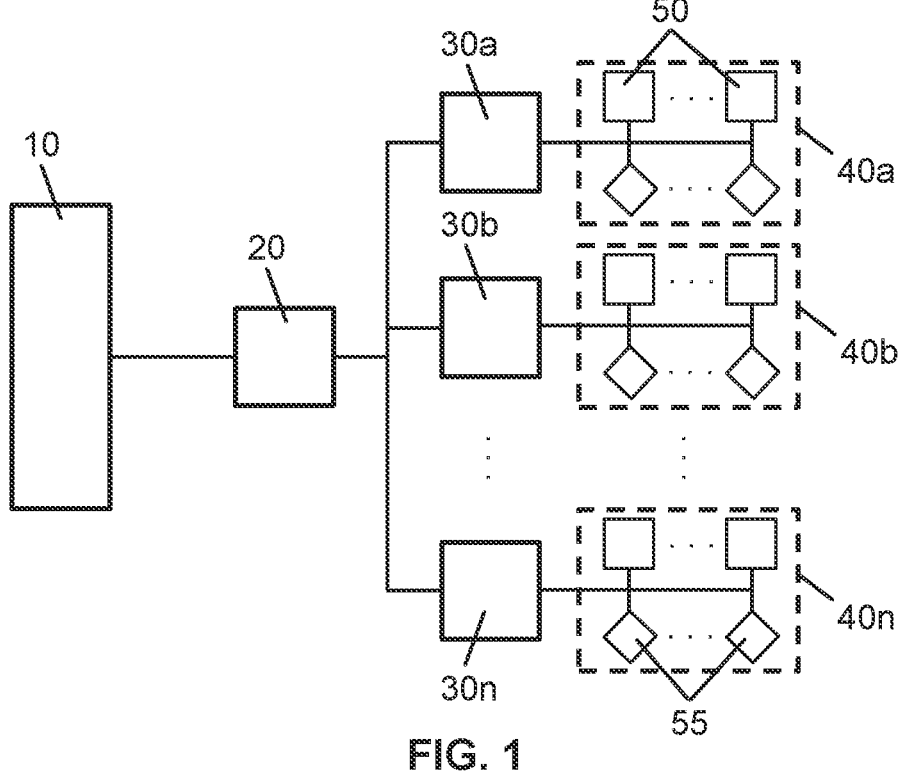
FIG. 1 shows an electrical network from electric grid to households.

FIG. 1 shows an electrical network.

The electrical network has an electric grid 10 that provides electricity to end consumers such as households 40a-40n. The electric grid 10 both delivers electricity to the end consumers for electrically powering devices, appliances and/or vehicles 50 that are associated with the households 40a-40n, and receives electricity produced by renewable electrical energy production devices 55 that are associated with the households 40a-40n. Although not illustrated, it is apparent that not all households 40a-40n have renewable electrical energy production devices 55 that can provide electricity to the electric grid 10.

Each household 40a-40n has an electricity controller 30a-30n associated therewith that manages both the ingress of electricity towards the household 40a-40n, namely the electricity supplied by the electric grid 10 is delivered to the household 40a-40n for powering of the devices, appliances and/or vehicles 50, and the egress of electricity towards the electric grid 10, namely the electricity provided by the renewable electrical energy production devices 55 is delivered to the electric grid 10.

An apparatus or system 20, which is a virtual power plant, is connected to all the electricity controllers 30a-30n for cooperation of the household or households 40a-40n with the remaining household or households 40a-40n and the electric grid 10. In this sense, the apparatus or system 20 communicates with the electricity controllers 30a-30n to establish whether electricity is available at the respective household 40a-40n and whether electricity is demanded by the respective household 40a-40n.

As the virtual power plant 20 has data from all households 40a-40n relative to the electricity production and electricity consumption thereof, and also has data about the electricity present and available at the electric grid 10, the plant 20 is capable of optimizing an overall electricity usage plan of the households 40a-40n or from a subset thereof. Hence, the virtual power plant 20, which comprises a computing apparatus, a computing system, a quantum apparatus, a quantum system, or a combination thereof, may conduct processes intended to optimize electricity usage to reduce the possible electric power generation that the electric grid 10 may need from non-renewable sources at different times within a predetermined period of time, and/or the possible electric power consumption of excess electricity available therein that the electric grid 10 requires from consumers.

Figure 2:
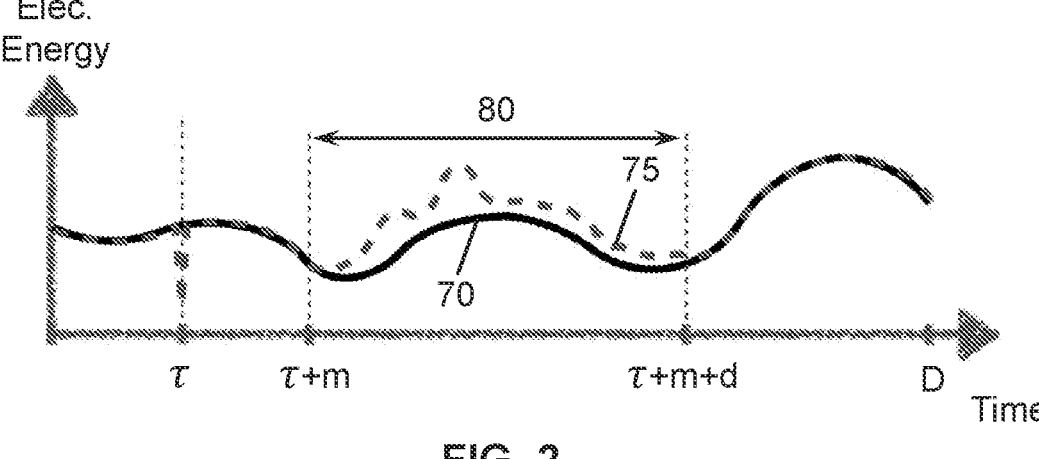
FIGS. 2 and 3 show examples of possible optimization of electricity usage for a household in accordance with embodiments.

FIG. 2 shows an example of a possible optimization of electricity usage for a household in accordance with embodiments. The optimization is shown by way of a graph that represents a predetermined period of time D.

A household has a number of renewable electrical energy production devices associated therewith for electricity production, that may be consumed by the household itself (devices, appliances and/or vehicles that are part of the household) and/or provided to the electric grid 10, for example when storing devices (e.g. batteries) within the household cannot store further electricity, or when the electric grid 10 demands electric power.

The household has a certain availability of renewable electrical energy production devices thereof for delivery of the electricity to the electric grid. The availability depends on a number of factors, e.g. consumption by the household, electricity production rate of the devices, weather, status of storing devices, etc. In this example, a simplified version of a predetermined electricity consumption plan 70 is shown for a predetermined period of time, but a predetermined electricity delivery plan for delivery to the electric grid could be provided as well for the predetermined period of time.

An apparatus or system (like the apparatus or system 20 of FIG. 1), manages the electricity resources of the household. The apparatus or system runs an optimization process for determining whether the household shall deliver electricity to the electric grid at different time periods within the predetermined period of time, and/or whether the household shall consume electricity from the electric grid (as described with reference to FIG. 3).

Upon running the optimization, the apparatus or system provides an optimized electricity usage plan 75 whereby the household is to deliver renewable electricity at a certain time period, in this case at time period z, which may last some time (e.g. 15 minutes, 30 minutes, 1 hour, etc.). To arrive at that optimized electricity usage plan (shown with a dashed line), the apparatus or system has determined that the household is expected to be in a restitution phase 80 after delivering part or the totality of its available renewable electricity to the electric grid. The restitution phase 80 starts after the end of the delivery to the grid, for instance at time $\tau$+m (where m is e.g. 30 minutes, 1 hour, 3 hours, etc.). During the restitution phase 80, the household is expected to consume less electricity available than if no excess electricity had been consumed, and particularly less electricity produced by its renewable electrical energy production devices. The duration d of the restitution phase 80 may be configurable, for example be set by the apparatus or system, or by a person having access to an electricity controller associated with the household.

This way, the electric grid gets to have renewable electrical energy that would otherwise potentially have to get from a non-renewable electrical energy source. Further, the household in exchange, might get to receive electricity produced by a renewable electrical energy source later on when its own production device(s) may not cope with the demand of the household.

The optimization can take place every time the predetermined period of time ends, or take place one or several times during the predetermined period of time to modify the delivery by the household (and/or consumption by the household) depending on the production status (and/or consumption status) of both the household and the electric grid.

Figure 3:
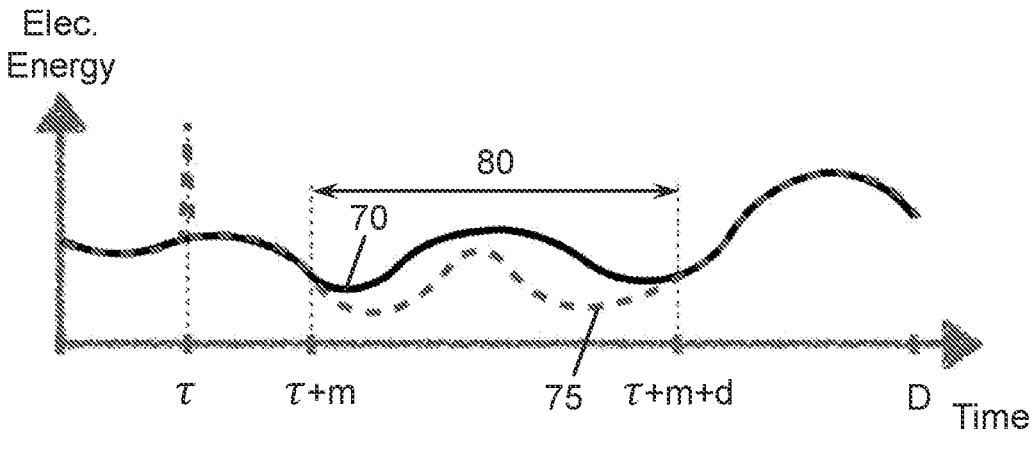

FIG. 3 shows a similar exemplary graph of a possible optimization of electricity usage for a household in accordance with embodiments, in this case from the consumption perspective.

The household has a predetermined electricity consumption plan 70 for a predetermined period of time.

Again, upon running an optimization by an apparatus or system (like the apparatus or system 20 of FIG. 1), said apparatus or system provides an optimized electricity usage plan whereby the household is to consume part of an excess electricity available in the grid at a certain time period z, for example the excess electricity can be stored in storing devices within the household, or be used to electrically power some appliances or vehicles. To arrive at that optimized electricity consumption plan 75, the apparatus or system has determined that the household is expected to be in a restitution phase 80 after consuming the excess electricity available. During the restitution phase 80, the household is expected to consume less electricity available than if no excess electricity had been consumed.

The optimization is effective for both the electric grid and the household because the household gets to use electricity of the electric grid that would be unused or stored otherwise, and the household would have required the same electricity later on when that might have caused the provision of electricity to the electric grid by non-renewable sources. Further, the electric grid in exchange, might get to receive electricity produced by the household later on when the household cannot use it, or at least have that electricity produced available for the electric grid in case of necessity. That, in turn, replaces other electric power generators that the electric grid needs, which may be from non-renewable sources, if there is a demand for electricity that the electric grid cannot cope with.

The apparatus or system may conduct this optimization from the perspective of electricity consumption and from the perspective of electricity delivery of the household. Further, the optimization can take place every time the predetermined period of time ends, or take place one or several times during the predetermined period of time to modify the consumption or delivery by the household depending on the consumption and production status of both the household and the electric grid.

In this text, the terms "includes", "comprises", and their derivations—such as "including", "comprising", etc.— should not be understood in an excluding sense, that is, these terms should not be interpreted as excluding the possibility that what is described and defined may include further elements, steps, etc.

On the other hand, the disclosure is obviously not limited to the specific embodiment(s) described herein, but also encompasses any variations that may be considered by any person skilled in the art—for example, as regards the choice of materials, dimensions, components, configuration, etc.—, within the general scope of the disclosure as defined in the claims.

The invention claimed is:

1. A method including the following steps:

computing, by an apparatus or system, availability of at least one renewable electrical energy production device that delivers electricity to at least one household associated therewith to deliver electricity to an electric grid, wherein:

the availability is computed for a predetermined period of time and is at least based on a predetermined electricity consumption plan for the predetermined period of time, the availability representing how much electricity the at least one renewable electrical energy production device may deliver to the electric grid at different time periods within the predetermined period of time; and the predetermined electricity consumption plan is associated with the at least one household and comprises electricity to be consumed by the at least one household at the different time periods within the predetermined period of time;

computing, by the apparatus or system, an electricity usage plan for the predetermined period of time, wherein:

the electricity usage plan is associated with the at least one household and represents both: the electricity to be delivered by the at least one renewable electrical energy production device associated with each household of the at least one household to the electric grid, and the electricity to be consumed by each household of the at least one household at the different time periods within the predetermined period of time; and the electricity usage plan is computed based, at least in part, on:

a set of values that is indicative of possible electric power generation that the electric grid has access to at different time periods within the predetermined period of time, wherein one or more electrical energy generators associated with the possible electric power generation are capable of starting electric power generation with a predetermined time delay and are capable of maintaining the electric power production for at least a predetermined time duration; and the computed availability of the at least one renewable electrical energy production device; and optimizing, by the apparatus or system, the electricity usage plan so that:

the electricity to be delivered by the at least one renewable electrical energy production device associated with the at least one household is to be delivered to the electric grid at one or more different time periods at least when an amount of the possible electric power generation corresponding to non-renewable electrical energy generators is greater than at other time periods within the predetermined period of time; and during a predetermined duration after the time period or periods when the electricity is delivered to the electric grid, the electricity delivered by said at least one renewable electrical energy production device, the electricity delivered by said at least one renewable electrical energy production device for consumption by the respective household of the at least one household is lower than the computed availability during said predetermined duration;

wherein the apparatus or system comprises one of: a computing apparatus, a computing system, a quantum apparatus, a quantum system, or a combination thereof.

2. The method of claim 1, further including the following step: commanding, by the apparatus or system, to deliver electricity from the at least one renewable electrical energy production device to the electric grid based on the optimized electricity usage plan.

3. The method of claim 1, further including the following step: estimating, by the apparatus or system, the electricity in the predetermined electricity consumption plan to be consumed by each household of the at least one household at different time periods within the predetermined period of time based on one or more sets of values with historical electricity consumption of the respective household.

4. The method of claim 1, wherein the computed availability of the at least one renewable electrical energy production device further represents, by way of a parameter or set of parameters, a minimum amount of possible electric power generation that must be provided by non-renewable electrical energy generators to the electrical grid at the different time periods for the at least one renewable electrical energy production device associated with the respective household to deliver electricity to the electrical grid rather than to be consumed by the respective household.

5. The method of claim 4, wherein the electricity usage plan is optimized such that households of the at least one household whose at least one renewable electrical energy production device is to deliver electricity to the electric grid each at least fulfills the following:

$$\left(E_{i,\tau}^{*,-} - E_{i,\tau}^{+}\right)\lambda_{i,\tau}^{+} \geq \sum_{t=\tau+m}^{D} \left(E_{i,t}^{+} P_{i,t}^{res,+} - E_{i,t}^{*,+} P_{i,t}^{*,+}\right)$$

where: D is the predetermined period of time; τ is a time period within D; an is a predetermined time after the end of time period τ that starts a restitution period;

$$E_{i,\tau}^{*,+}$$

and $$E_{i,t}^{*,+}$$

are electrical energy consumption of the t-th household of the at least one household at time periods τ and t in the electricity usage plan;

$$E_{i,\tau}^{+} \text{ and } E_{i,t}^{+}$$

are optimizable electrical energy available at time periods and t for delivery by the f-th household of the at least one household in the electricity usage plan; $\lambda_{i,\tau}$ is the optimizable parameter or set of parameters defining, for time period τ, an objective to be met for electricity to be delivered to the electric grid by the different devices of the at least one renewable electrical energy production device of the f-th household of the at least one household;

$$P_{t}^{*,+}$$

is a parameter associated with the electrical energy consumption at time period t that is representative, at least in part, of an amount of the electrical energy being from non-renewable electrical energy sources; and $$P_{t}^{res,\rightarrow}$$

is a parameter associated with the electrical energy consumption during the predetermined duration after time period t that is representative, at least in part, of an amount of the electrical energy being from non-renewable electrical energy sources.

6. The method of claim 1, wherein the electricity usage plan is optimized by minimizing the following function for each household of the at least one household:

$$C_0 = \sum_{\sigma=\pm}\sum_{\tau=0}^{D}\sigma\left[\sum_i\left(E_{i,\tau}^{\sigma} - E_{i,\tau}^{+,\sigma}\right)\lambda_{i,\tau}^{\sigma} - \left(\Gamma_{\tau}^{\sigma} - \hat{\lambda}_{\tau}^{\sigma}\right)\hat{E}_{i,\tau}^{\sigma}\eta_{\tau}^{\sigma}\right]$$

where: D is the predetermined period of time; τ is a time period within D; m is a predetermined time after the end of time period τ that starts a restitution period;

$$E_{i,\tau}^{*,+}$$

is electrical energy consumption of the t-th household of the at least one household at time period τ in the electricity usage plan;

$$E_{i,\tau}^{\omega}$$

is optimizable electrical energy available at time period τ for delivery by the t-th household of the at least one household in the electricity usage plan;

$$\lambda_{i,\sigma}^{\sigma}$$

is the optimizable parameter or set of parameters defining, for time period τ, an objective to be met for electricity to be delivered to the electric grid by the different devices of the at least one renewable electrical energy production device of the t-th household of the at least one household;

$$\hat{E}_{\tau}^{\sigma}$$

is an optimizable term defining which renewable electrical energy production devices or which part of the electricity to be delivered to the electric grid will do so participating as starting participant at time period τ, and which other devices or other part will do so participating as backup participant at time period $$\tau; \hat{\lambda}_{\tau}^{\sigma}$$

is an optimizable parameter or set of parameters defining, for time period τ, an objective to be met for electricity to be delivered to the electric grid by the at least one household either as starting participants or as backup participants;

$$\Gamma_{\tau}^{\sigma}$$

is the set of values that is indicative of possible electric power generation that the electric grid has access to at different time periods;

$$\eta_{\tau}^{\sigma}$$

is a parameter defining a level of stochasticity of or level of confidence in carrying out the delivery of electricity to the electric grid.

7. The method of claim 4, wherein optimizing the electricity usage plan comprises: constructing, for each household of the at least one household, a respective availability vector corresponding to all renewable electrical energy production devices associated with the respective household; wherein the electricity usage plan is optimized based on the constructed availability vectors.

8. The method of claim 1, wherein the electricity usage plan is optimized such that the electricity usage plan additionally fulfills the following:
   electricity is to be consumed, by one or more households of the at least one household, from the electric grid at one or more different time periods within the predetermined period of time at least when excess electricity is available in the electric grid (i.e. the demand is lower than the available electricity); and
   during a predetermined duration after the time period or periods when the excess electricity is to be consumed, the electricity consumed by said one or more households is lower than that in the predetermined electricity consumption plan during said predetermined duration.

9. The method of claim 8, wherein the electricity usage plan is optimized such that the electricity usage plan it additionally fulfills the following:
   the excess electricity to be consumed is at time periods when the amount of excess electricity is the greatest, thereby evening out the excess electricity within the predetermined period of time; and/or
   the computed availability indicates that electricity is going to be produced by at least one renewable electrical energy production device of the one or more households after the time period (or periods) when the excess electricity is to be consumed.

10. The method of claim 8, wherein the electricity usage plan is optimized such that households of the at least one household consume the excess electricity from the electric grid such that each at least fulfills the following:

$$\left(E_{i,\tau}^{-} - E_{i,\tau}^{*,-}\right)\lambda_{i,\tau}^{-} \leq \sum_{t=\tau+m}^{D} \left(E_{i,t}^{*,-} P_{i,t}^{*,-} - E_{i,t}^{-} P_{i,t}^{res,-}\right)$$

where: D is the predetermined period of time; τ is a time period within D; m is a predetermined time after the end of time period τ that starts a restitution period;

$$E_{i,\tau}^{*,-} \text{ and } E_{i,t}^{*}$$

are electrical energy consumption of the i-th household of the at least one household at time periods τ and t in the electricity usage plan;

$$E_{i,\tau}^{-} \text{ and } E_{i,t}^{-}$$

are optimizable electrical energy consumptions at time periods τ and t by the t-th household of the at least one household in the electricity usage plan;

$$\lambda_{i,\tau}^{-}$$

is the optimizable parameter or set of parameters defining, for time period τ, an objective to be met for the excess electricity to be consumed by the t-th household of the at least one household;

$$P_{+}^{*,-}$$

is a parameter associated with the electrical energy consumption at time period t that is representative, at least in part, of how much excess electricity is available; and $$P_{+}^{res,-}$$

is a parameter associated with the electrical energy consumption during restitution (i.e. the predetermined duration after time period t) that is representative, at least in part, of how much excess electricity is available.

11. The method of claim 1, wherein optimizing the electricity usage plan is carried out by:

providing, for each household of the at least one household, a respective matrix product state with a plurality of tensors, each tensor corresponding to a time subinterval of the predetermined period of time, and each tensor connected to both the tensor of the preceding time subinterval and the tensor of the posterior time subinterval with the proviso of first and last tensors of the matrix product state that are connected to one of the tensors; and optimizing each provided matrix product state.

12. The method of claim 11, wherein, prior to the optimization of each provided matrix product state, each provided matrix product state is decomposed into:

a first tensor codifying an electricity available for delivery by the respective renewable electrical energy production device or devices at the different time periods in the electricity usage plan together with a binary variable defining whether the respective renewable electrical energy production device or devices are to deliver the electricity to the electric grid; and a second tensor codifying a minimum amount of possible electric power generation that must be provided by non-renewable electrical energy generators to the electrical grid at the different time periods for the respective renewable electrical energy production device or devices to deliver electricity to the electrical grid rather than to be consumed by the at least one household associated therewith; and a third tensor codifying binary variables defining whether the respective renewable electrical energy production device or devices participate as starting participants or backup participants in the delivery of electricity to the electric grid at the different time periods.

13. The method of claim 11, wherein the optimization of each provided matrix product state is carried out by way of density matrix renormalization group or time-evolution block-decimation.

14. A data processing device or system including means for carrying out the steps of the method according to claim 1.

15. A computer program product including instructions which, when the program is executed by a computing apparatus or system, cause the computing apparatus or system to carry out the steps of the method according to claim 1.

* * * * *